US012803740B2

(12) United States Patent
Sun et al.

(10) Patent No.: US 12,803,740 B2
(45) Date of Patent: Nov. 17, 2026

(54) METHOD AND APPARATUS TO SUPPORT UE CSI REPORT OF TIME DOMAIN CHANNEL PROPERTIES AND INTERFERENCE MEASUREMENTS

(71) Applicant: APPLE INC., Cupertino, CA (US)

(72) Inventors: Haitong Sun, Cupertino, CA (US); Ismael Gutierrez Gonzalez, San Jose, CA (US); David Neumann, Munich (DE); Anchit Malhotra, Cupertino, CA (US); Ghaith N Hattab, Cupertino, CA (US); Louay Jalloul, Cupertino, CA (US); Dawei Zhang, Saratoga, CA (US); Weidong Yang, San Diego, CA (US); Wei Zeng, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 539 days.

(21) Appl. No.: 17/935,000

(22) Filed: Sep. 23, 2022

(65) Prior Publication Data

US 2024/0056255 A1 Feb. 15, 2024

Related U.S. Application Data

(60) Provisional application No. 63/370,945, filed on Aug. 10, 2022.

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0626* (2013.01); *H04L 5/006* (2013.01);
(Continued)

(58) Field of Classification Search
None
See application file for complete search history.

(56) References Cited

U.S. PATENT DOCUMENTS

2016/0241434 A1 8/2016 Li et al.
2018/0242164 A1* 8/2018 Lee ....................... H04L 1/0026
(Continued)

OTHER PUBLICATIONS

Interdigital, Inc. , "Aspects of CSI Enhancements", R1-2203380, 3GPP TSG RAN WG1 #109-e, e-Meeting, Agenda Item 9.1.2, May 9-20, 2022, 7 pages.
(Continued)

*Primary Examiner* — Suk Jin Kang
(74) *Attorney, Agent, or Firm* — Dorsey & Whitney LLP

(57) ABSTRACT

Systems and methods are provided for to support user equipment (UE) channel state information (CSI) report of time domain channel properties concurrently with Interference Measurement Resources (IMRs) measurements. Embodiments herein consider Uplink Control Information (UCI) multiplexing, UCI omission, Interference Measurement Resource (IMR) configuration, and phase continuity handling. A CSI report configuration (CSI-ReportConfig) may comprise configuration details for both one or more Channel Measurement Resources (CMRs) and one or more Interference Measurement Resources (IMRs). The CMRs may be used to measure time domain channel properties (TDCP) based on a CSI reference signal (CSI-RS) for tracking reference signal (TRS).

18 Claims, 9 Drawing Sheets

(51) Int. Cl.
*H04L 5/14* (2006.01)
*H04W 24/10* (2009.01)
*H04W 52/02* (2009.01)

(52) U.S. Cl.
CPC ............... *H04L 5/14* (2013.01); *H04W 24/10* (2013.01); *H04W 52/0216* (2013.01)

(56) References Cited

U.S. PATENT DOCUMENTS

2018/0367289 A1* 12/2018 Kim ...................... H04L 5/0092
2019/0281487 A1* 9/2019 Liu
2020/0084714 A1* 3/2020 Medles ................. H04W 24/10
2020/0106549 A1* 4/2020 Bagheri ................ H04W 80/08
2020/0107319 A1* 4/2020 Bagheri ................ H04W 72/23
2021/0400677 A1* 12/2021 Lee
2022/0060992 A1* 2/2022 Xue ...................... H04W 72/23
2022/0124740 A1* 4/2022 Ji ........................... H04B 7/024
2022/0256458 A1* 8/2022 Noh ......................... H04B 7/06
2022/0279518 A1* 9/2022 Lin ....................... H04L 5/0094
2022/0353947 A1* 11/2022 Babaei .................. H04W 76/28
2022/0417776 A1* 12/2022 Manolakos ........... H04L 5/0048
2023/0246687 A1* 8/2023 Rahman ............... H04B 7/0626 370/329
2023/0254718 A1* 8/2023 Rahman ................ H04L 5/0035 370/252
2023/0370139 A1* 11/2023 Rahman ............ H04W 72/0446
2023/0422073 A1* 12/2023 Liu
2024/0340796 A1* 10/2024 Zhou ..................... H04L 1/0027
2024/0421877 A1* 12/2024 Frenne
2024/0422679 A1* 12/2024 Freda ................ H04W 52/0229
2025/0142389 A1* 5/2025 Dai ........................ H04W 24/10
2025/0184789 A1* 6/2025 Noh .................... H04W 72/231

OTHER PUBLICATIONS

Nokia, "Corrections on eIAB", R1-2205677, Change Request 38.214 CR 0286, Current Version 17.1.0, May 9-20, 2022, 4 pages.
PCT/US2023/071907, International Search Report and Written Opinion, Nov. 28, 2023, 17 pages.
Samsung , "NR MIMO evolution for downlink and uplink", RP-221393, 3GPP TSG RAN Meeting #96, Budapest, Hungary, Agenda Item 9.3.1.4, Jun. 6-9, 2022, 21 pages.
ZTE , "CSI enhancement for high/medium UE velocities and CJT", R1-2203265, 3GPP TSG RAN WG1 Meeting #109-e, e-Meeting, Agenda Item 9.1.2, May 9-20, 2022, 14 pages.
U.S. Appl. No. 17/934,993, Non-Final Office Action, Feb. 20, 2025, 9 pages.
U.S. Appl. No. 17/935,015, Non-Final Office Action, Feb. 20, 2025, 10 pages.
Notice of Allowance, Jul. 1, 2025, 8 pages.
U.S. Appl. No. 17/935,015, Notice of Allowance, Aug. 5, 2025, 5 pages

* cited by examiner

METHOD AND APPARATUS TO SUPPORT UE CSI REPORT OF TIME DOMAIN CHANNEL PROPERTIES AND INTERFERENCE MEASUREMENTS

TECHNICAL FIELD

This application relates generally to wireless communication systems, including reporting of time domain channel properties.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a user equipment (UE). However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Certain systems (e.g., 3GPP Release (Rel) 15, 16, and 17) support advanced channel state information (CSI) reporting by exploiting channel correlations. For example, channel spatial correlation can be exploited to support higher resolution CSI feedback in both the Type I and Type II multiple input multiple output (MIMO) codebook. Channel frequency correlation can be exploited to reduce CSI overhead in Type II CSI Rel-16 enhancement. Channel downlink (DL) and uplink (UL) correlation can be exploited for reciprocity based MIMO. For UL operation, systems can support non-codebook based Physical Uplink Shared Channel (PUSCH) operation. For DL operation, systems can support cri-RI-CQI reporting and Type II port selection codebook.

However, so far, new radio (NR) has not adequately exploited the channel time domain correlation. Wireless channel is typically time varying, and channel has certain coherence time depending on UE movement speed, and the environment change rate. However, this information is typically not reported by the UE to the network. For Rel-18 MIMO enhancement, there is interest to support reporting of time domain channel properties (TDCP).

However, details regarding such reporting have not been established. It is therefore desirable to specify UE reporting of the time domain channel properties. CSI reporting enhancements for high/medium UE velocities by exploiting time-domain correlation/Doppler-domain information to assist DL precoding, targeting FR1, may include: Rel-16/17 Type-2 codebook refinement, without modification to the spatial and frequency domain basis; and/or UE reporting of time-domain channel properties measured via CSI-RS for tracking.

The measurement of time domain channel properties is based on Tracking Reference Signal (TRS), i.e., "CSI-RS for tracking." Currently, NR does not support CSI reporting based on TRS. Embodiments herein comprise design details to support UE CSI report of time domain channel properties UE processing related design for reporting time domain channel properties. Embodiments herein consider Uplink Control Information (UCI) multiplexing, UCI omission, Interference Measurement Resource (IMR) configuration, and phase continuity handling.

Figure 1:
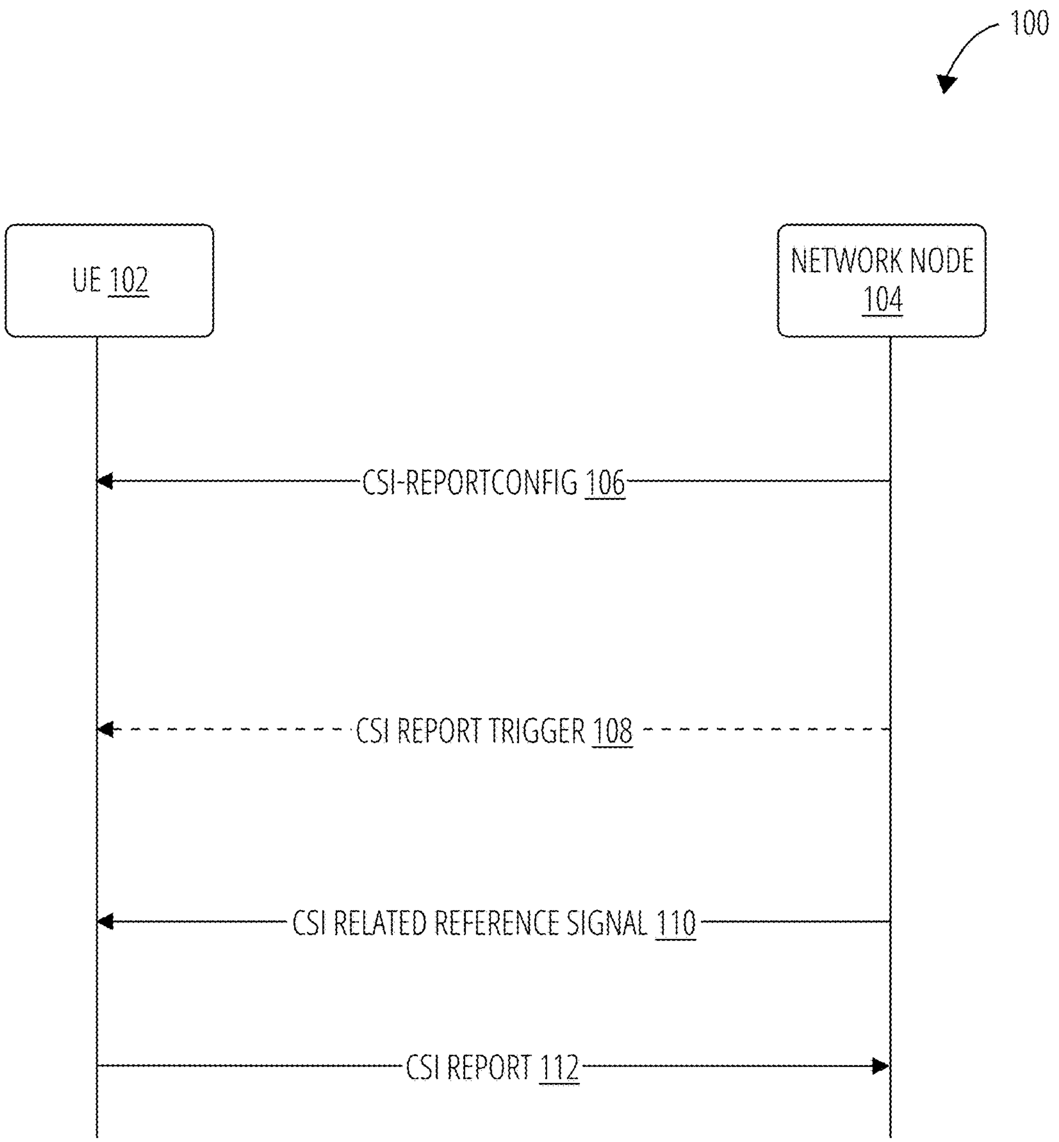
FIG. 1 illustrates a signal flow diagram for supporting UE CSI report of time domain channel properties in accordance with some embodiments.

FIG. 1 illustrates a signal flow diagram 100 for supporting UE CSI report of time domain channel properties. The network node 104 may encode and send the UE 102 a CSI report configuration (CSI-ReportConfig 106). The network node 104 may use the CSI-ReportConfig 106 to configure the CSI report 112. The UE 102 may decode the CSI-ReportConfig 106 to determine a configuration (e.g., details and timing) for the CSI related reference signal 110 and the CSI report 112. The CSI-ReportConfig 106 may comprise information related to the CSI related reference signal 110 and the desired information in the CSI report 112. For instance, the CSI-ReportConfig 106 may include a configuration for the UE 102 to measure and report TDCP based on CSI-RS for TRS.

For aperiodic CSI reports, the network node 104 may transmit a CSI report trigger 108 to the UE 102. The network node 104 may transmit the CSI related reference signal 110 to the UE 102, and the UE 102 may perform measurements on the CSI related reference signal 110. The UE 102 may report the measurements in the CSI report 112. In some embodiments, the UE 102 may use UCI multiplexing for the CSI report 112.

There are a significant number of different metrics that the UE 102 may report on. In some embodiments, when UE 102 is configured to report time domain channel properties (TDCP) based on CSI-RS for tracking (TRS), in the same CSI-ReportConfig the UE 102 is not expected to be configured to report other report quantity (reportQuantity). In some embodiments, when UE 102 is configured to report TDCP based on CSI-RS for TRS, in the same CSI-ReportConfig, the UE 102 can be configured to report other report quantity (reportQuantity).

In some embodiments, UCI multiplexing may be used by the UE 102 to report multiple CSIs in the same report. Further, there may be restrictions on what measurements the UE 102 may report. For example, when the UE 102 is configured to report TDCP based on CSI-RS for TRS, in the same CSI-ReportConfig, if UE 102 can be configured to report other report quantity (reportQuantity), the simultaneously reported reportQuantity may be limited to one or multiple of the following choices: layer 1 or physical layer (L1)-Reference Signal Received Power (RSRP); CapabilityIndex; L1-Signal to Interference and Noise Ratio (SINR); and Channel Quality Indicator (CQI). In some embodiments, the simultaneously reported reportQuantity cannot be: CSI-Resource Indicator (CRI), synchronization signal block Resource Indicator (SSBRI), rank indicator (RI), Precoding Matrix Indicator (PMI), and the strongest layer indicator (LI). In other words, the network node 104 may not request the UE 102 to provide CRI, SSBRI, RI, PMI, or LI in the same report as TDCP.

Figure 2:
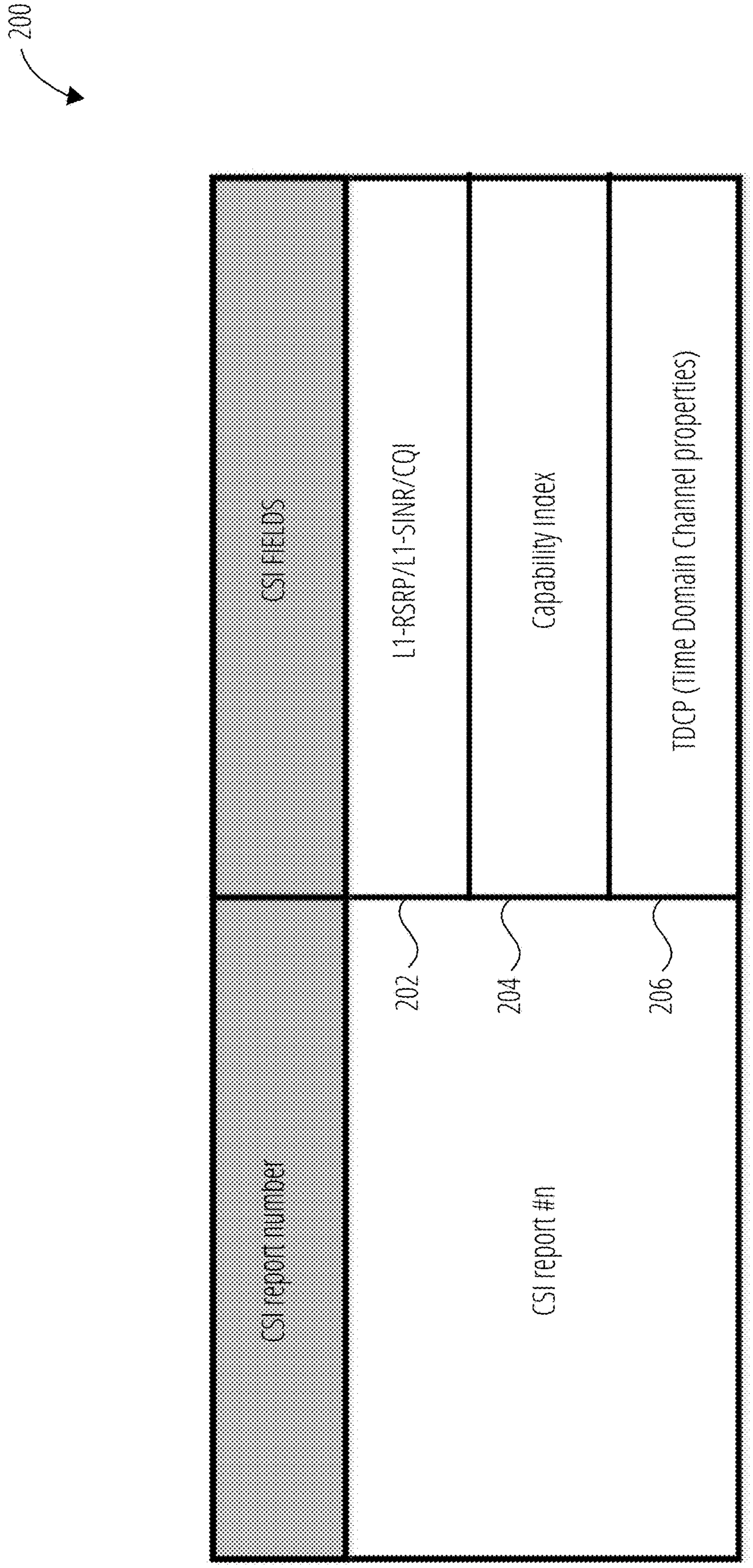
FIG. 2 illustrates a UCI assembly in accordance with some embodiments.

The UE 102 may encode the CSI report 112 in a standardized order so the network node 104 may know how to decode the CSI report 112. For example, FIG. 2 illustrates a UCI assembly 200 in accordance with some embodiments. When UE is configured to report TDCP based on CSI-RS for TRS, in the same CSI-ReportConfig 106 as other report quantity, the UCI assembly 200 may be formatted as illustrated. As shown, the UCI assembly 200 may include a first field 202 with L1-RSRP/L1-SINR/CQI. After the first field 202, the UCI assembly 200 may include a capability index field 204. A third field after the capability index field 204 may comprise the TDCP 206.

Additionally, the network node 104 may configure the reporting of other report quantities when the UE 102 is configured to report TDCP based on CSI-RS for TRS. The network node 104 may configure the UE 102 to report the other report quantities together with the TDCP via various means. In some embodiments, the network node 104 may configure whether the UE 102 is to report other quantity simultaneously via Radio Resource Control (RRC). In some embodiments, the network node 104 may configure whether the UE 102 is to report other quantity simultaneously via Medium Access Control Control Element (MAC-CE). In some embodiments, at least for aperiodic (AP)-CSI, the network node 104 may indicate whether UE 102 to report other quantity simultaneously via Downlink Control Information (DCI).

The CSI report 112 or UCI may be carried over a physical channel (e.g., PUSCH or physical uplink control channel (PUCCH)). It is possible that the network node 104 may not be able to support all of the bits in the CSI report 112 due to scheduling. Therefore, in some embodiments, the UE 102 may omit data from the CSI report 112 based on priority.

UCI Omission

UCI omission may be used due to the number of bits scheduled by the network. If the CSI report will exceed a payload size the UE may omit the TDCP and/or other report quantity according to a defined priority. For example, there may not be a sufficient number of bits for all of CSI reporting in the UCI assembly 200. Accordingly, some embodiments may support UCI omission. When UE is configured to report TDCP based on CSI-RS for tracking (TRS), UCI omission and CSI processing unit (CPU) handling, for the same CSI reporting type (aperiodic or semi-persistent or periodic), the priority of TDCP CSI may be one of the following options.

In some embodiments, UCI omission may be applied using two levels. For example, in a first option, TDCP CSI=L1-RSRP/L1-SINR>other CSI. In other words, in some embodiments, the TDCP CSI has equal priority as the L1-RSRP/L1-SINR, and other CSI information is a lower priority. Thus, if the payload is not large enough to support all the information in a CSI report 112 than TDCP CSI and L1-RSRP/L1-SINR will have priority and other CSI may be dropped. In some embodiments, other CSI may include CapabilityIndex and CQI.

A second option may be L1-RSRP/L1-SINR>other CSI=TDCP CSI. In other words, in some embodiments, the L1-RSRP/L1-SINR has a higher priority, and TDCP CSI and other CSI information have a lower priority. Thus, in some embodiments, if the payload is not large enough to support all the information in a CSI report 112 than L1-RSRP/L1-SINR will have priority, and TDCP CSI and other CSI may be dropped.

In some embodiments, UCI omission may be applied using three levels. Using the two level approach may be less complex to implement, whereas using the two level approach may allow a greater ability to define a desired priority. As a third UCI priority option, TDCP CSI>L1-RSRP/L1-SINR>other CSI. As a fourth priority option, L1-RSRP/L1-SINR>TDCP CSI>other CSI, and as a fifth priority option, L1-RSRP/L1-SINR>other CSI>TDCP CSI. Different embodiments may employee different priorities as desired.

In some embodiments, when UE 102 is configured to report TDCP based on CSI-RS for tracking (TRS) in a same CSI-ReportConfig with other report quantity (reportQuantity) simultaneously, the UE 102 may perform one of the following options. In a first option, if the UE 102 omits/drops CSI, the UE 102 drops all the report quantity in the same CSI-ReportConfig. In a second option (option 2), if the UE 102 omits/drops CSI, the UE 102 drops different parts of report quantity in the same CSI-ReportConfig with different priority. For example, in sub option (option 2.1), the UE 102 may first drop other report quantity, then the UE 102 drops TDCP if needed. As another sub option (option 2.2) the UE 102 first drops TDCP, then, UE drops other report quantity if needed.

In some embodiments, discontinuous reception (DRX) may be used to reduce power consumption. For example, the UE 102 may listen for information from the network node 104 periodically based on a wake up signal from the network node 104. In some embodiments, when the UE 102 is configured to report TDCP based on CSI-RS for tracking (TRS), when drx-onDurationTimer in DRX-Config is not started the UE may perform one of the following options. In a first option, the UE 102 is not required to measure TDCP CSI. In a second option, the UE 102 may still measure TDCP CSI with the following restrictions.

For option 2, the UE 102 may be required to measure only the periodic TDCP CSI. Further, the UE 102 may report, to the network node 104, the UE 102 capability of to support reporting TDCP CSI measured when drx-onDurationTimer in DRX-Config is not started. In some embodiments, the network node 104 may explicitly configure whether the UE 102 shall report TDCP CSI measured when drx-onDurationTimer in DRX-Config is not started. In some embodiments, a new RRC configuration may be introduced for the configuration. The network node 104 may send the new RRC configuration to the UE 102 to configure whether the UE 102 should report the TDCP CSI. In some embodiments, an existing RRC configuration (e.g., either ps-TransmitOtherPeriodicCSI or ps-TransmitPeriodicL1-RSRP) may be reused for the configuration.

CSI may include two types of measurement resources, CMR and IMR. CMR may be used to measure a channel (e.g., measure the TDCP). IMR may be used to measure the strength of interference from other resources and signals not intended for a UE. IMR measurements may include L1-SINR and CQI.

IMR Configuration

In some embodiments, when UE is configured to report time domain channel properties (TDCP) based on CSI-RS for tracking (TRS), the following are the options regarding IMR configuration.

In a first option, the IMR cannot be configured, neither non-zero power (NZP)-IMR (NZP-CSI-RS) nor zero power (ZP)-IMR (e.g., CSI-IM). In other words, the network node 104 may not be able to configure the UE 102 to measure and report IMR.

In a second option, the network node 104 may configure the UE 102 to measure and report the IMR with some restrictions. The CSI-ReportConfig 106 may include configuration details for both IMR and CMR, the UE 102 may measure the IMR and the CMR, and the CSI report 112 may include both measurements from IMR and CMR. In some embodiments, only ZP-IMR (e.g., CSI-IM) can be configured. In some embodiments, either ZP-IMR (e.g., CSI-IM) or NZP-IMR (NZP-CSI-RS) can be configured, but not both in the same CSI-ReportConfig. In some embodiments, ZP-IMR or NZP-IMR or ZP-IMR+NZP-IMR can be configured.

In some embodiments, when UE is configured to report TDCP based on CSI-RS for tracking (TRS), if IMR can be configured, the following are two options regarding IMR configuration. In option 1, the IMR resource can be configured one to one mapped to the configured CSI-RS (CMR). For example, if TRS contains four CSI-RS as CMR, the network configures four IMR. Each IMR is associated with its corresponding CMR, assuming the same quasi co-location (QCL). In option 2, only one IMR resource can be configured. The one IMR may be associated with multiple CMR. For example, if TRS contains four CSI-RS as CMR, and the network configures one IMR, the one IMR may correspond to the four CMR.

Figure 3:
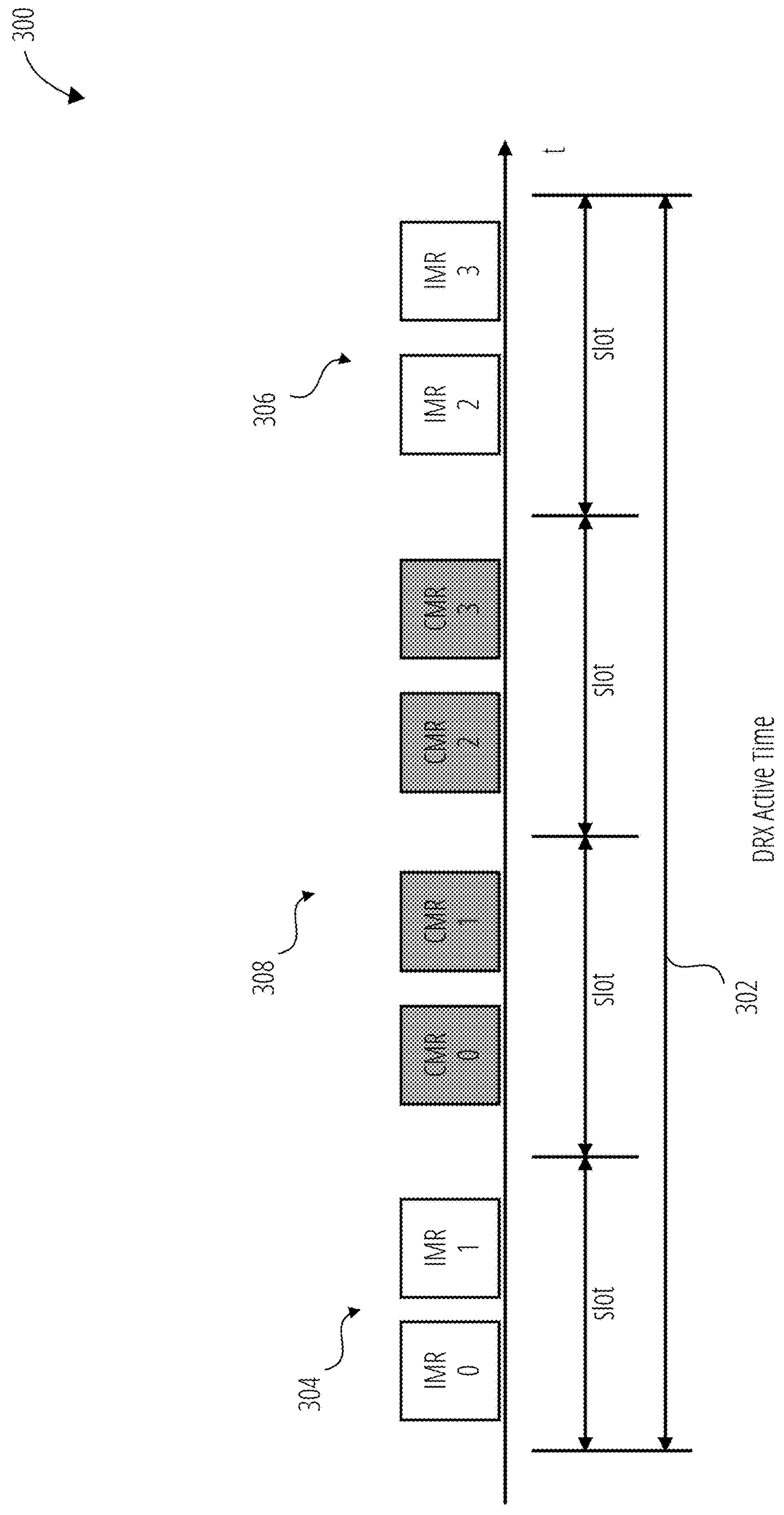
FIG. 3 illustrates a scheduling restriction based on the DRX active time in accordance with some embodiments.
Figure 4:
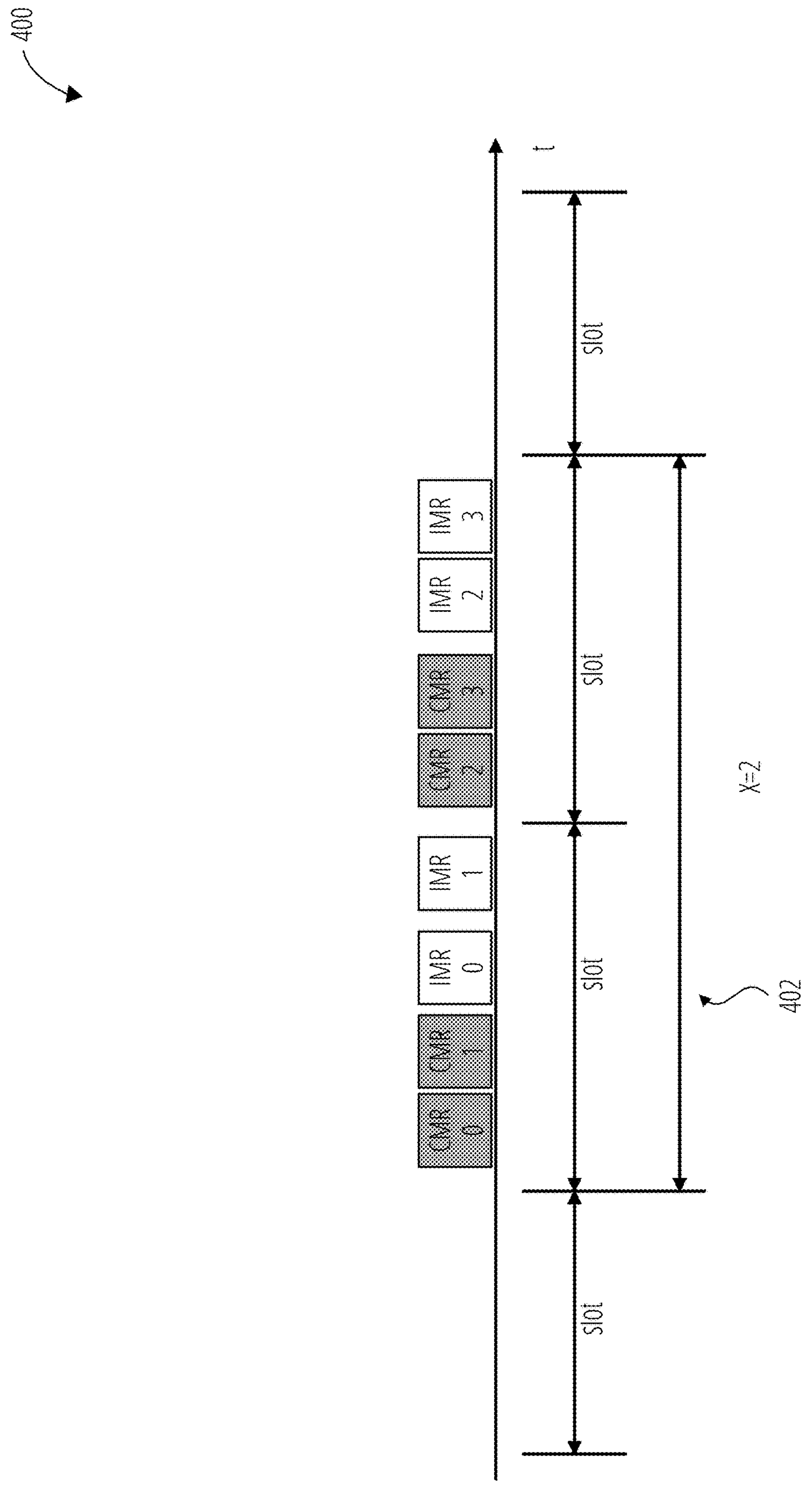
FIG. 4 illustrates a scheduling restriction based on a number of slots in accordance with some embodiments.

The scheduling of the IMR may be configured to reduce power consumption at the UE 102. For example, when UE 102 is configured to report time domain channel properties (TDCP) based on CSI-RS for tracking (TRS), if IMR can be configured, scheduling restrictions for IMR and CMR may be implemented. FIG. 3 and FIG. 4 illustrate two potential scheduling restrictions.

FIG. 3 illustrates a scheduling restriction 300 based on the DRX active time 302. The IMR and CMR may be configured in the same DRX active time 302 as shown in FIG. 3. This scheduling restriction 300 may ensure that the UE does not perform CMR and IMR activities occur outside of the DRX active time 302. In the illustrated embodiment, the DRX active time 302 includes four slots. The first two IMRs 304 occur in a first slot of the DRX active time 302 and the second two IMRs 306 occur in a last slot of the DRX active time 302. As shown, the CMRs 308 corresponding to the IMRs may occur during the second and third slots. Accordingly, the UE may perform multiple CMR measurements and associated IMR measurements in the same DRX active time 302.

FIG. 4 illustrates a scheduling restriction 400 based on a number of slots. The IMR and CMR may be configured within X slots (e.g., X=2, 3, or 4). In the illustrated embodiment, the IMR and CMR are configured within two slots 402. If there is no restriction, the IMR and CMR measurements may occur across an extended period of time. During that time, the UE may be consuming power and storing a measurement while waiting for additional measurements before sending the report. Limiting the number of slots able to be configured for IMR and CMR may reduce UE power consumption and UE memory usage. In some embodiments, the IMR and CMR may be restricted to be both configured in the same DRX active time and within X slots.

Phase Continuity Handling

TDCP measurements may be based on the channel between the UE and the network node. For instance, the UE may take multiple measurements of the channel and determine phase change at the different locations. The UE can use the measurements to derive phase change and Doppler shift. However, the difference in the measurements may be skewed if a phase change is introduced between the measurements. For instance, if the UE switches between receiving and transmitting (e.g., a duplex direction change) between the measurements, the phase of the channel may be interrupted for the channel. Accordingly, the difference between measurements may be inaccurate due to the phase interruption leading to an inaccurate TDCP measurement.

Figure 5:
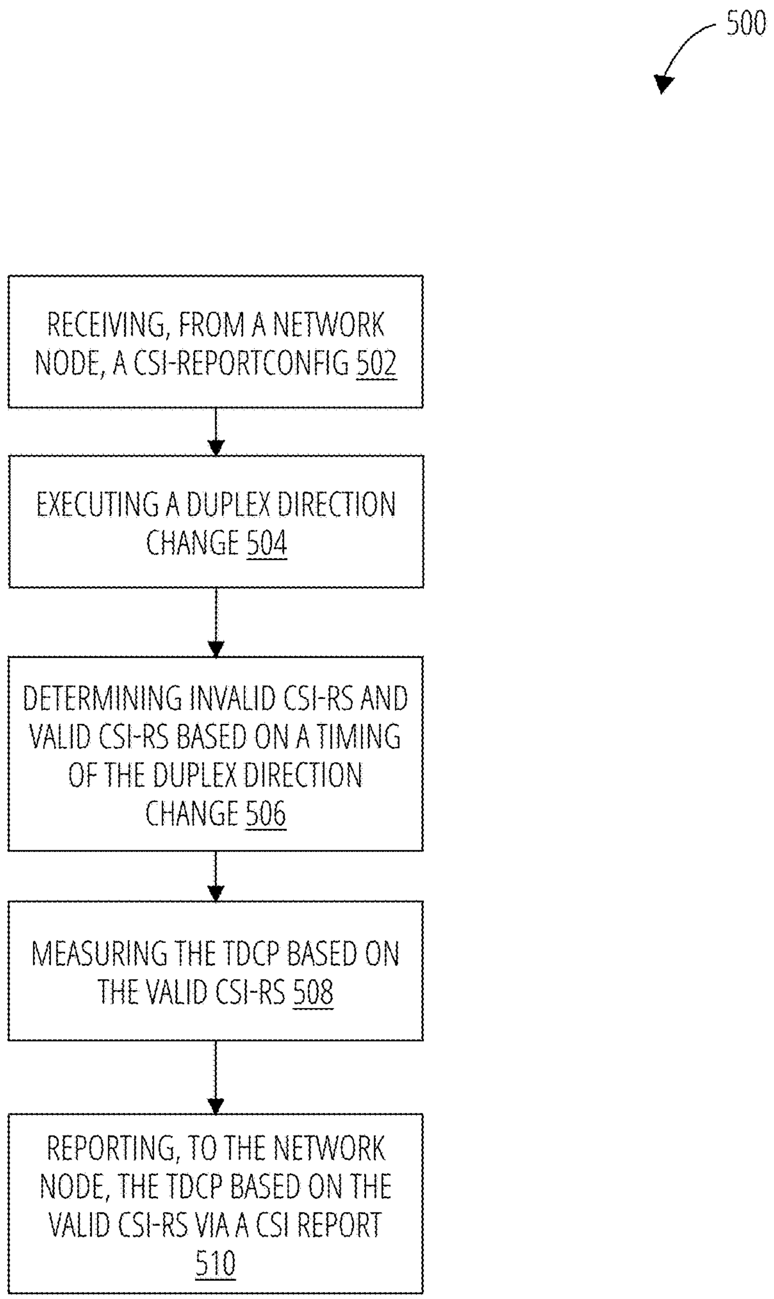
FIG. 5 illustrates a method for a UE to handle phase continuity in accordance with some embodiments

FIG. 5 illustrates a method 500 for a UE to handle phase continuity. The UE may receive 502, from a network node, a CSI-ReportConfig. The CSI-ReportConfig may include details regarding measurement and reporting of TDCP based on CSI-RS resources for TRS. However, the UE may execute 504 a duplex direction change which may interfere with the TDRP measurement. The duplex direction change may occur when the UE switches from receiving to transmitting and back to receiving.

The UE may determine 506 invalid CSI-RS resources and valid CSI-RS resources based on a timing of the duplex direction change. In some embodiments, when the UE is configured to report TDCP based on CSI-RS for TRS, UE may measure TRS only when UE can ensure the phase continuity during the TRS measurement. The phase continuity is disrupted when the UE performs duplex direction change between CSI-RS resource in the same TRS set. In some embodiments, when the phase continuity is disrupted, the UE is not required to measure the TRS transmission in which the phase continuity is disrupted. The UE may measure 508 the TDCP based on the valid CSI-RS resources, and report, to the network node, the TDCP based on the valid CSI-RS resources via a CSI report.

Figure 6:
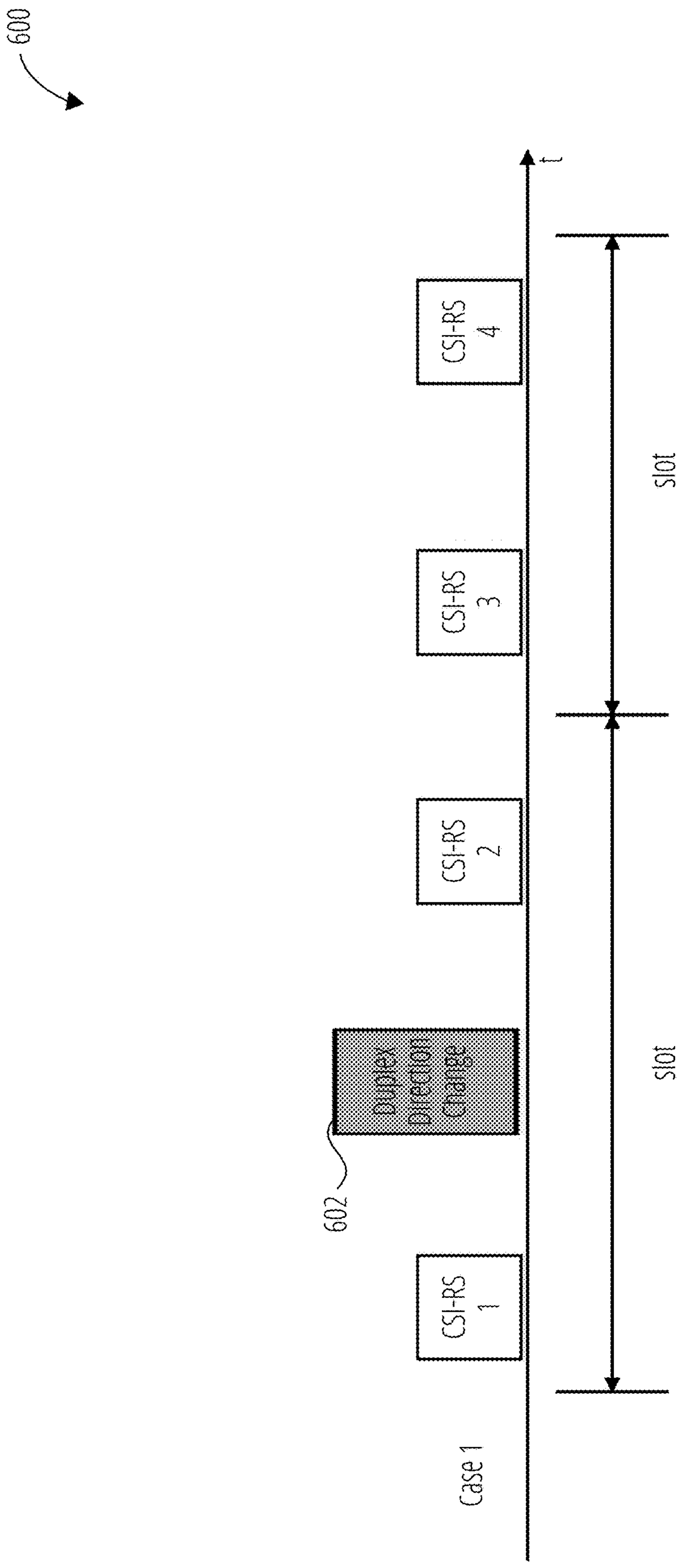
FIG. 6 illustrates a timeline of a phase continuity interruption in accordance with some embodiments.

In some embodiments, the determination of valid and invalid resources may depend on the timing of the CSI-RS resources relative to the duplex direction change. For example, FIG. 6 illustrates a timeline 600 of a phase continuity interruption according to a first case. The timeline 600 includes four CSI-RS resources in a TRS set, and a duplex direction change 602. The illustrated timeline 600 is referred to herein as case 1. In case 1, the phase continuity interruption happens between two CSI-RS resources in the same slot.

In some embodiments, for interruptions as shown in the case 1 (i.e., phase continuity interruption happens between two CSI-RS resources in the same slot), the following options may be employed. In some embodiments, the UE may consider all CSI-RS resources invalid for TDCP measurement, including CSI-RS 1, CSI-RS 2, CSI-RS 3, and CSI-RS 4. The UE may not measure these invalid CSI RS resources.

In some embodiments, a UE may consider some CSI-RS resources still valid for TDCP measurement even with the duplex direction change 602. In some embodiments, the UE may determine that valid CSI-RS resources include CSI-RS 3 and CSI-RS 4 that may be used for TDCP measurements. In some embodiments, the UE may consider CSI-RS 2, CSI-RS3, and CSI-RS 4 valid CSI-RS resources that may be used for TDCP measurements. As CSI-RS 2 is in a different slot than CSI-RS3, and CSI-RS 4, the UE may perform additional time domain processing to account for a different amount of time between CSI-RS 2 and CSI-RS3 than is between CSI-RS3 and CSI-RS 4. The additional use of CSI-RS 2 may provide a more accurate TDCP measurement at the cost of potential additional processing.

Figure 7:
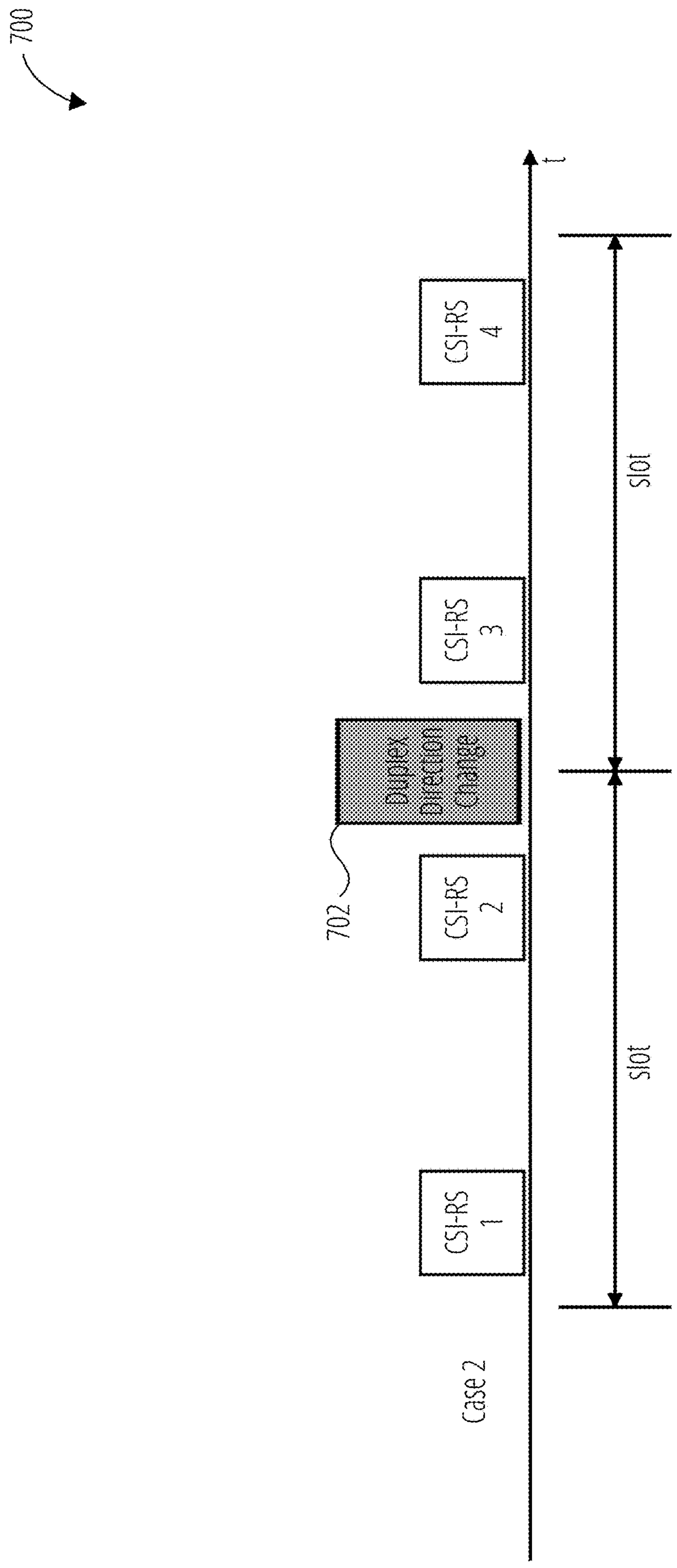
FIG. 7 illustrates a timeline of a second case of phase continuity interruption in accordance with some embodiments.

FIG. 7 illustrates a timeline 700 of a second case of phase continuity interruption. For interruption case 2, the phase continuity interruption (e.g., duplex direction change 702) happens between two pairs of CSI-RS resources in adjacent slot. In some embodiments, the UE may determine that all CSI-RS resources are invalid for TDCP measurement, including CSI-RS 1, CSI-RS 2, CSI-RS 3, and CSI-RS 4. In some embodiments, the UE may determine that all CSI-RS resources are valid for TDCP measurement, including CSI-RS 1, CSI-RS 2, CSI-RS 3, and CSI-RS 4. Because the duplex direction change 702 occurs between pairs of CSI-RS resources, the UE may measure TDCP based on CSI-RS resources in the first slot and then measure the TDCP based on the CSI-RS resources of the second slot and combine those two TDCP measurements to suppress measurement noise and obtain a more accurate measurement. In some embodiments, the UE may determine that only one pair of CSI-RS resources are valid for TDCP measurement (e.g., either {CSI-RS 1, CSI-RS 2} or {CSI-RS 3, CSI-RS 4}).

In some embodiments, the UE's response to the first case and the second case as described with reference to FIG. 7 and FIG. 8 may be performed by a same embodiment. That is, the UE may behave differently depending on where the duplex direction change 702 occurs.

In some embodiments, when the UE is configured to report TDCP based on CSI-RS for TRS and when UE is not required to measure the TRS transmission in which the phase continuity is disrupted, the following embodiments provide details regarding how the invalid CSI-RS resources may be counted for CSI processing unit (CPU) occupation and active CSI-RS. In some embodiments, the invalid CSI-RS that cannot be used for TDCP measurement may still occupy the CPU. In some embodiments, for CPU occupation, invalid an CSI-RS does not occupy the CPU. In some embodiments, for active CSI-RS, an invalid CSI-RS is still counted as active CSI-RS. In some embodiments, for active CSI-RS, an invalid CSI-RS is not counted as active CSI-RS.

Figure 8:
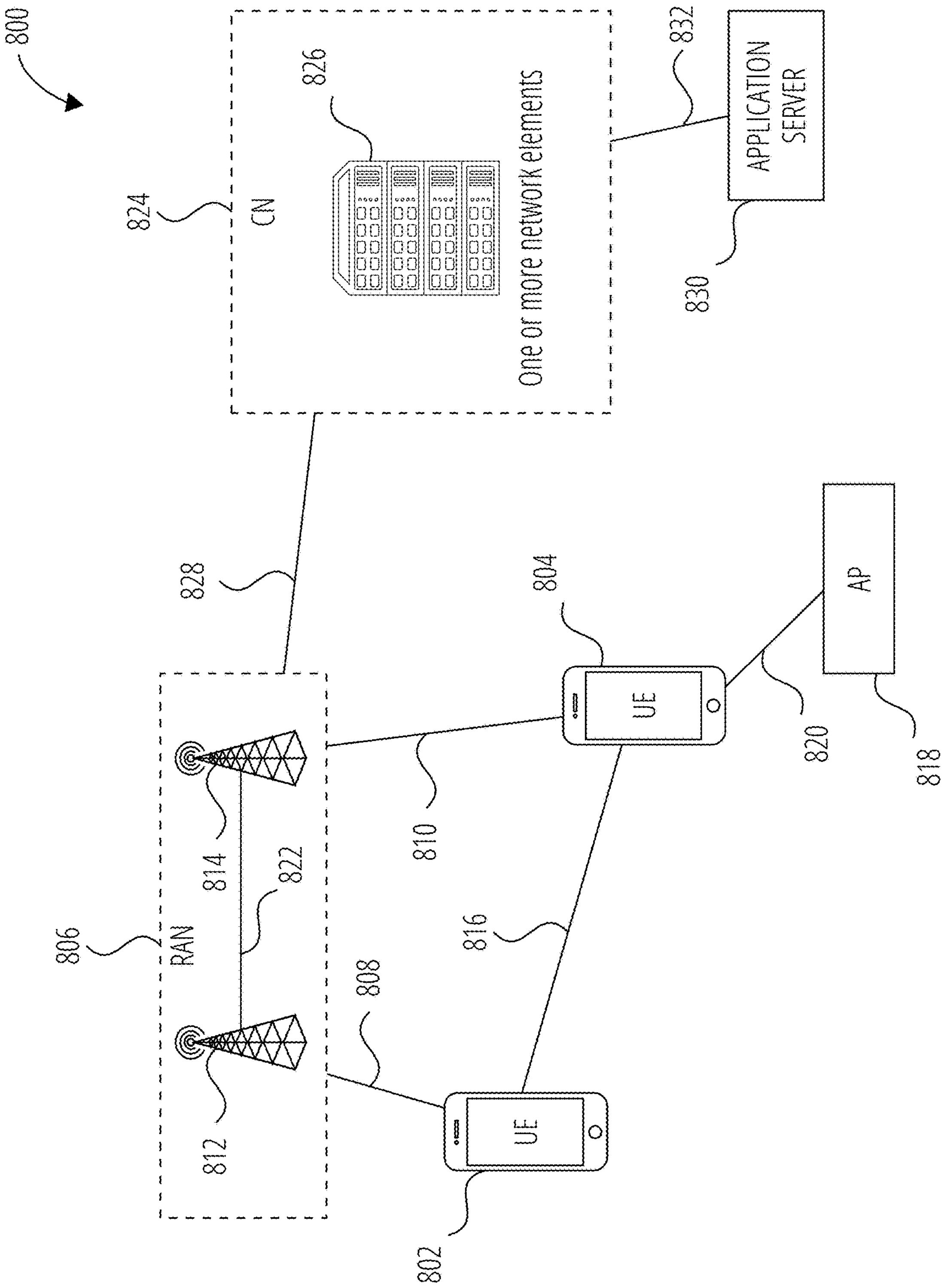
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touchscreen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations (such as base station 812 and base station 814) that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the Si interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
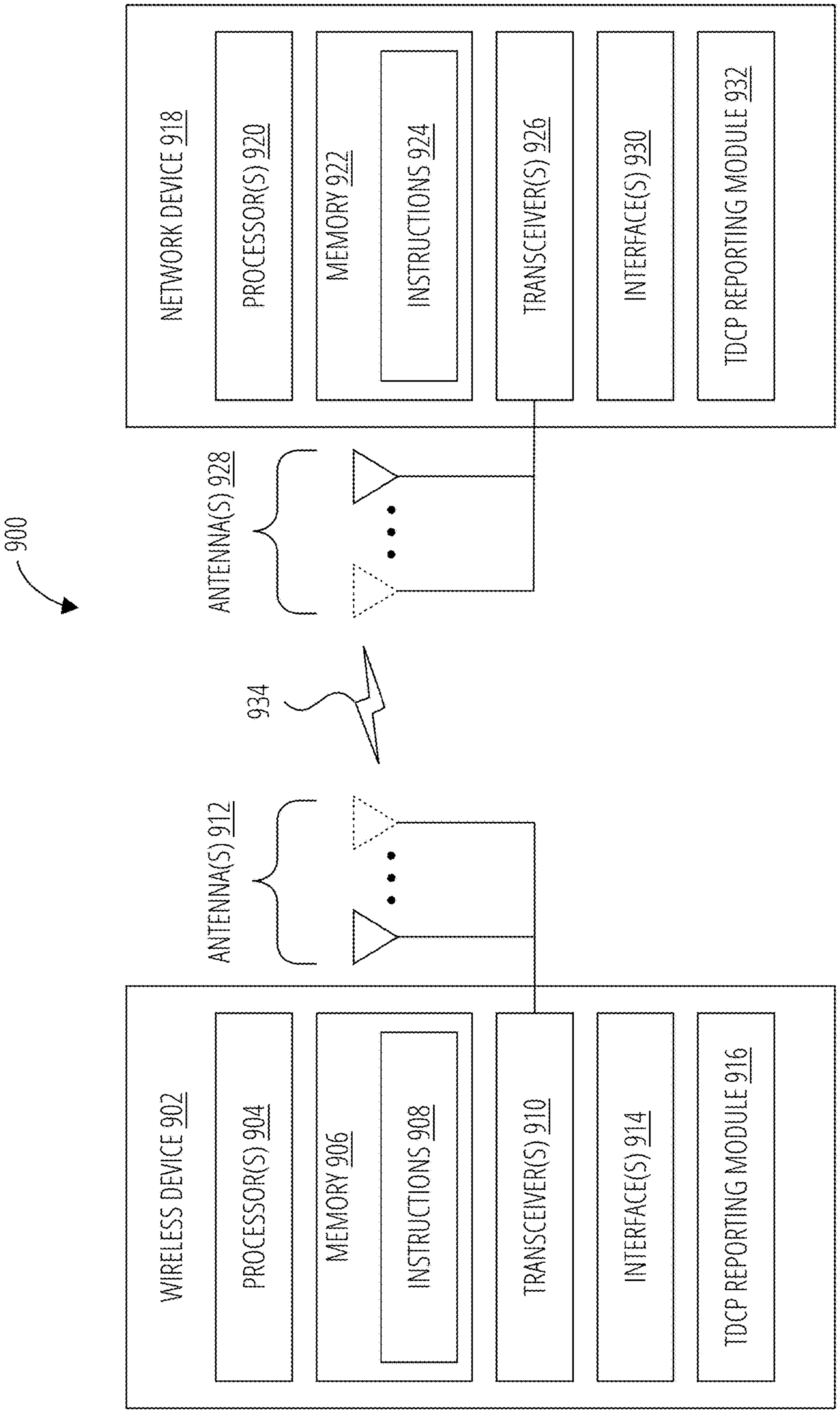
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a TDCP reporting module 916. The TDCP reporting module 916 may be implemented via hardware, software, or combinations thereof. For example, the TDCP reporting module 916 may be implemented as a processor, circuit, and/or instructions 908 stored in the memory 906 and executed by the processor(s) 904. In some examples, the TDCP reporting module 916 may be integrated within the processor(s) 904 and/or the transceiver(s) 910. For example, the TDCP reporting module 916 may be implemented by a combination of software components (e.g., executed by a DSP or a general processor) and hardware components (e.g., logic gates and circuitry) within the processor(s) 904 or the transceiver(s) 910.

The TDCP reporting module 916 may be used for various aspects of the present disclosure, for example, aspects of FIGS. 1-5. The TDCP reporting module 916 is configured to report CSI of time domain channel properties.

The network device 918 may include one or more processor(s) 920. The processor(s) 920 may execute instructions such that various operations of the network device 918 are performed, as described herein. The processor(s) 920 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 228 of the network device 918 to facilitate signaling (e.g., the signaling 934) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

The network device 918 may include a TDCP reporting module 932. The TDCP reporting module 932 may be implemented via hardware, software, or combinations thereof. For example, the TDCP reporting module 932 may be implemented as a processor, circuit, and/or instructions 924 stored in the memory 922 and executed by the processor(s) 920. In some examples, the TDCP reporting module 932 may be integrated within the processor(s) 920 and/or the transceiver(s) 926. For example, the TDCP reporting module 932 may be implemented by a combination of software components (e.g., executed by a DSP or a general processor) and hardware components (e.g., logic gates and circuitry) within the processor(s) 920 or the transceiver(s) 926.

The TDCP reporting module 932 may be used for various aspects of the present disclosure, for example, aspects of FIGS. 1-5. The TDCP reporting module 932 is configured to support UE CSI report of time domain channel properties.

Embodiments contemplated herein include an apparatus comprising means to perform one or more elements of the methods disclosed herein. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the methods disclosed herein. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the methods disclosed herein. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the methods disclosed herein. This apparatus may be, for example, an apparatus of a UE (such as a wireless device 902 that is a UE, as described herein).

Embodiments contemplated herein include a signal as described in or related to one or more elements of the methods disclosed herein.

Embodiments contemplated herein include a computer program or computer program product comprising instructions, wherein execution of the program by a processor is to cause the processor to carry out one or more elements of the methods disclosed herein. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Embodiments contemplated herein include an apparatus comprising means to perform one or more elements of the methods disclosed herein. This apparatus may be, for example, an apparatus of a base station (such as a network device 918 that is a base station, as described herein).

Embodiments contemplated herein include one or more non-transitory computer-readable media comprising instructions to cause an electronic device, upon execution of the instructions by one or more processors of the electronic device, to perform one or more elements of the methods disclosed herein. This non-transitory computer-readable media may be, for example, a memory of a base station (such as a memory 922 of a network device 918 that is a base station, as described herein).

Embodiments contemplated herein include an apparatus comprising logic, modules, or circuitry to perform one or more elements of the methods disclosed herein. This apparatus may be, for example, an apparatus of a base station (such as a network device 918 that is a base station, as described herein).

Embodiments contemplated herein include an apparatus comprising: one or more processors and one or more computer-readable media comprising instructions that, when executed by the one or more processors, cause the one or more processors to perform one or more elements of the methods disclosed herein. This apparatus may be, for example, an apparatus of a base station (such as a network device 918 that is a base station, as described herein).

Embodiments contemplated herein include a signal as described in or related to one or more elements of the methods disclosed herein.

Embodiments contemplated herein include a computer program or computer program product comprising instructions, wherein execution of the program by a processing element is to cause the processing element to carry out one or more elements of the methods disclosed herein. The processor may be a processor of a base station (such as a processor(s) 920 of a network device 918 that is a base station, as described herein). These instructions may be, for example, located in the processor and/or on a memory of the base station (such as a memory 922 of a network device 918 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:

receiving, from a network node, a channel state information (CSI) report configuration (CSI-ReportConfig), wherein the CSI-ReportConfig comprises configuration details for both one or more Channel Measurement Resources (CMRs) and one or more Interference Measurement Resources (IMRs), wherein the one or more CMRs are used to measure time domain channel properties (TDCP) based on a CSI reference signal (CSI-RS) for a tracking reference signal (TRS);

configuring, based on the CSI-ReportConfig, the UE to perform measurements using the one or more CMRs and the one or more IMRs, wherein the CSI-ReportConfig comprises a scheduling restriction for TDCP measurements and corresponding IMR measurements, wherein the scheduling restriction causes the one or more IMRs and the one or more CMRs to be configured in a same discontinuous reception (DRX) active time and in a defined number of slots within the same DRX active time, wherein the defined number of slots comprises two slots, three slots, or four slots within the same DRX active time, wherein the defined number of slots is a subset of a number of slots within the DRX active time during which the one or more IMRs and the one or more CMRs are configured, wherein other slots within the DRX active time that are outside of the defined number of slots are restricted from being configured with the one or more IMRs and the one or more CMRs;

measuring the one or more IMRs and the TDCP based on the CSI-RS for the TRS; and reporting, to the network node, the TDCP and the corresponding IMR measurements.

2. The method of claim 1, wherein the one or more IMR comprise a zero power IMR (ZP-IMR).

3. The method of claim 1, wherein the one or more IMRs are configured to comprise a non-zero power IMR (NZP-IMR) or a ZP-IMR but not both.

4. The method of claim 1, wherein the one or more IMRs are configured to comprise one or both of a non-zero power IMR (NZP-IMR) and a ZP-IMR.

5. The method of claim 1, wherein each IMR is mapped to a single CMR.

6. The method of claim 1, wherein a single IMR is associated with multiple CMRs.

7. A user equipment (UE) comprising:

a processor; and a memory storing instructions that, when executed by the processor, configure the UE to:

receive, from a network node, a channel state information (CSI) report configuration (CSI-ReportConfig), wherein the CSI-ReportConfig comprises configuration details for both one or more Channel Measurement Resources (CMRs) and one or more Interference Measurement Resources (IMRs), wherein the one or more CMRs are used to measure time domain channel properties (TDCP) based on a CSI reference signal (CSI-RS) for a tracking reference signal (TRS);

configure, based on the CSI-ReportConfig, the UE to perform measurements using the one or more CMRs and the one or more IMRs, wherein the CSI-ReportConfig comprises a scheduling restriction for TDCP measurements and corresponding IMR measurements, wherein the scheduling restriction causes the one or more IMRs and the one or more CMRs to be configured in a same discontinuous reception (DRX) active time and in a defined number of slots within the same DRX active time, wherein the defined number of slots comprises two slots, three slots, or four slots within the same DRX active time, wherein the defined number of slots is a subset of a number of slots within the DRX active time during which the one or more IMRs and the one or more CMRs are configured, wherein other slots within the DRX active time that are outside of the defined number of slots are restricted from being configured with the one or more IMRs and the one or more CMRs;

measure the one or more IMRs and the TDCP based on the CSI-RS for the TRS; and report, to the network node, the TDCP and the corresponding IMR measurements.

8. The UE of claim 7, wherein the one or more IMRs comprises a zero power IMR (ZP-IMR).

9. The UE of claim 7, wherein the one or more IMRs are configured to comprise a non-zero power IMR (NZP-IMR) or a ZP-IMR but not both.

10. The UE of claim 7, wherein the one or more IMRs are configured to comprise one or both of a non-zero power IMR (NZP-IMR) and a ZP-IMR.

11. The UE of claim 7, wherein each IMR is mapped to a single CMR.

12. The UE of claim 7, wherein a single IMR is associated with multiple CMRs.

13. A method for a network node, the method comprising:

encoding a channel state information (CSI) report configuration (CSI-ReportConfig), wherein the CSI-ReportConfig comprises configuration details for both one or more Channel Measurement Resources (CMRs) and one or more Interference Measurement Resources (IMRs), wherein the one or more CMRs are used to measure time domain channel properties (TDCP) based on a CSI reference signal (CSI-RS) for a tracking reference signal (TRS), wherein the CSI-ReportConfig comprises a scheduling restriction for TDCP measurements and corresponding IMR measurements, and wherein the scheduling restriction causes the one or more IMRs and the one or more CMRs to be configured in a same discontinuous reception (DRX) active time and in a defined number of slots within the same DRX active time, wherein the defined number of slots comprises two slots, three slots, or four slots within the same DRX active time, wherein the defined number of slots is a subset of a number of slots within the DRX active time during which the one or more IMRs and the one or more CMRs are configured, wherein other slots within the DRX active time that are outside of the defined number of slots are restricted from being configured with the one or more IMRs and the one or more CMRs;

sending, to a user equipment (UE), the CSI-ReportConfig to configure the UE to measure the TDCP based on the CSI-RS for the TRS and the one or more IMRs; and receiving a report from the UE comprising measurements of the TDCP and the one or more IMRs.

14. The method of claim 13, wherein the one or more IMRs comprise a zero power IMR (ZP-IMR).

15. The method of claim 13, wherein the one or more IMRs comprise a non-zero power IMR (NZP-IMR) or a ZP-IMR but not both.

16. The method of claim 13, wherein the one or more IMRs comprise one or both of a non-zero power IMR (NZP-IMR) and a ZP-IMR.

17. The method of claim 13, wherein each IMR is mapped to a single CMR.

18. The method of claim 13, wherein a single IMR is associated with multiple CMRs.

* * * * *